US007105191B2

(12) United States Patent
Mishra

(10) Patent No.: US 7,105,191 B2
(45) Date of Patent: Sep. 12, 2006

(54) CALCIUM SUPPLEMENT FOR ANIMALS AND METHOD FOR MAKING SAME

(75) Inventor: Surendra K. Mishra, The Woodlands, TX (US)

(73) Assignee: Tetra Technologies, Inc., The Woodlands, TX (US)

( * ) Notice: Subject to any disclaimer, the term of this patent is extended or adjusted under 35 U.S.C. 154(b) by 384 days.

(21) Appl. No.: 10/444,304

(22) Filed: May 23, 2003

(65) Prior Publication Data

US 2004/0234650 A1  Nov. 25, 2004

(51) Int. Cl.
  *A23L 1/304* (2006.01)
(52) U.S. Cl. .................. 426/74; 426/89; 426/635; 426/641
(58) Field of Classification Search ............. 426/74, 426/635, 89, 641
  See application file for complete search history.

(56) References Cited

U.S. PATENT DOCUMENTS

| | | | | |
|---|---|---|---|---|
| 2,504,788 A * | 4/1950 | Baker | ............. | 426/74 |
| 4,283,423 A * | 8/1981 | Watkins et al. | ............. | 426/69 |
| 5,656,309 A | 8/1997 | Sawhill | ............. | 426/41 |
| 5,733,590 A | 3/1998 | Holladay | ............. | 426/69 |
| 5,917,110 A * | 6/1999 | Kust | ............. | 71/27 |
| 5,997,601 A | 12/1999 | Kurst | ............. | 71/27 |
| 6,391,454 B1 * | 5/2002 | Mao et al. | ............. | 428/407 |

OTHER PUBLICATIONS http://cattle.purinamills.com/tech/notesonmaximizing.html Notes on Maximizing the Benefits of Urea, 2001.
http://www.inchem.org/documents/jecfa/jecmono/v32je16.htm Urea, Dr. P. Olson, date unavailable.
http://www.olssons.com.au/protein.html Protein, Using Urea to Supplement Livestock, date unavailable.

* cited by examiner

*Primary Examiner*—Helen Pratt
(74) *Attorney, Agent, or Firm*—D'Ambrosio & Associates, P.L.L.C.; Jo Katherine D'Ambrosio, J.D.

(57) ABSTRACT

A calcium supplement for animals comprising one or more coatings over a calcium-containing core. The coatings provide additional nutrients as well as providing a moisture-resistant outer coating to reduce the hygroscopic effects of the calcium-containing core. The supplement comprises calcium-containing core particles, calcium chloride for example, each particle having an animal nutrient coating over an outer surface of the core particles. The supplement further comprises a second coating, urea, deposited over the nutrient coating, and a final outer coating comprising one or more fatty acids or paraffinic hydrocarbons that are agreeable to animals. The method for making a calcium supplement for animals comprises coating calcium-containing granules with a layer of nutrients and then spraying molten soluble urea onto the previously coated calcium-containing granules which are sufficiently cool to solidify the molten material into second coating on the granules. A third coating of one or more fatty acids or paraffinic hydrocarbon is sprayed onto the urea coating.

43 Claims, No Drawings

CALCIUM SUPPLEMENT FOR ANIMALS AND METHOD FOR MAKING SAME

FIELD OF THE INVENTION

The present invention relates to a nutrient supplement for animals and the method for making the nutrient supplement. More particularly to a calcium supplement coated with one or more materials to slow, delay, or inhibit the rate of moisture uptake by the calcium core material.

BACKGROUND OF THE INVENTION

Calcium is a ubiquitous element that occurs commonly in nature both in soluble (calcium chloride, sea water) and insoluble (gypsum, limestone) forms. It is a macronutrient essential to all life forms.

Apart from calcium being vital for proper bone and teeth formation (approximately 99% of calcium found in the animal are in bones and teeth), it also functions in transmission of nerve impulses and contraction of muscle tissue. Because of its importance in bone structure, deficiency of calcium in young animals leads to skeletal deformation. In older animals, similar to older human beings, fragile bone can result from extended periods of dietary calcium deficiency. Calcium is also needed for the blood clotting process for animals; and many enzymes present in an animal's body require calcium for their activities. Age, size, sex and physiological state of the animals determine their calcium requirement.

Comprising about 1.5% of a bird's weight, calcium is the predominant mineral in its body. Similar to other animals, calcium in a bird's body is used for bone formation, blood clotting, muscle and nerve function, and for the activation of enzymes. It also effects the formation of eggshells.

For animals, critical times to ensure that diets contain adequate calcium are during pregnancy (for proper growth of the fetus) and during lactation (to prevent excessive calcium mobilization from the bones of the lactating animals). Animals in full lactation draw on the calcium reserves in bone for manufacturing of milk. During this period, a tremendous amount of calcium is drawn into colostrums and milk. As a result, the animal's blood can become deficient in calcium and onsets Milk Fever.

The chick's requirements for calcium constitute only a small percentage of the total diet (0.6%). The growing chicks, unlike young mammals that receive their calcium from milk, are most sensitive to low levels of calcium up to 3 weeks of age. After this, their tolerance to the low levels of calcium increases. However, too little calcium can cause demineralization of bone (fracturing), soft eggshells, and inadequate calcium levels in the blood. Diets that are deficient in calcium are supplemented with calcium in drinking water or mixed with the seeds. When the bird enters egg production, her need for calcium more than triples in order to support shell formation. Clearly, at this time a source of calcium supplement is needed.

The soluble calcium salts, including calcium chloride which is the most prominent, present problems: liquid forms of these salts create bulk for shipping and storage purposes because of their high water content (65% to 70% $H_2O$). Anhydrous soluble calcium salts (90% to 95% $CaCl_2$), however, are hygroscopic and deliquescent, i.e. they absorb water to the point that the salts dissolve, creating even more long term shipping, storage and handling problems. Commercial solutions of calcium chloride and urea, the urea added to provide nitrogen in the conditioning process, are also available. Disadvantages of these solution products include their high water content, which increases weight and therefore increases the cost of transportation, and storage per unit of calcium. Extra equipment and costs are necessary because solutions require that liquid application devices be used.

The problem associated with providing dry, granular soluble calcium-containing products is the moisture-absorbing characteristics of these products. As mentioned above, the hygroscopic and deliquescent properties associated with the anhydrous soluble calcium salts and some of their hydrates create storage, handling and usage problems. Frequently, moisture is absorbed by the stored salt and converts the initially free-flowing salt to a solid rock-like mass. This severely limits the shelf life, creates handling and disposal problems that often lead to damaged goods, extra expenses, and sometimes-total loss of the product.

Unfortunately, admixtures of hygroscopic calcium salts with nutrients do not avoid the moisture uptake problem. For example, calcium chloride and urea form an adduct that is at least as or even more hygroscopic than calcium chloride itself.

Holladay, U.S. Pat. No. 5,733,590, teaches a slow release non-protein nitrogen liquid feed supplement that is made by mixing a 38 wt. % calcium chloride solution with dry urea. Liquids are expensive to ship and require greater care in handling and packing.

Watkins et al., U.S. Pat. No. 4,283,423 discloses a homogeneous urea containing composition as an animal feed supplement. Urea and particular forms of calcium sulfate are mixed and pelletized by compression compaction. In other embodiments, the urea-calcium sulfate constitutes animal feed supplements to be blended with non-hygroscopic nutrients such as calcium phosphate.

Calcium Sulfate and Calcium Phosphate are not as readily soluble and therefore not an easily available source of calcium.

In a promotional paper written by the SODA Company out of Monaco, a feed supplement is disclosed that is a dry calcium chloride using a coating agent of fatty acids.

None of these references, however, teach or suggest a core of a calcium-containing material, which is hygroscopic or deliquescent, combined with other nutrients and protected from moisture intake by a less hygroscopic, soluble non-calcium coating material.

SUMMARY OF THE INVENTION

The present invention relates to the discovery that particles of soluble calcium-containing materials can be coated with another nutrient, urea, which is also soluble, but nonetheless inhibits moisture uptake by the calcium-containing material. In this invention both the coating material and the calcium-containing material are beneficial in the desired application of providing feed supplements to animals. As one example, particles comprising a calcium chloride core and a soluble urea coating can be stored, shipped and applied as a free-flowing solid with better resistance to moisture than the calcium chloride without the coating. Additional nutrients can be added to the calcium containing particles either as an admixture with the calcium particles or as another coating.

Broadly, the calcium supplement for animals of this invention comprises one or more coatings over a calcium-containing core.

Advantageously, the coatings can provide additional nutrients as well as providing a moisture-resistant outer coating to reduce the hydroscopic effects of the calcium-containing core. In one preferred embodiment, the supplement comprises calcium-containing core particles, each particle having an animal nutrient coating over an outer surface of the particles. The supplement further comprises a second coating, urea, deposited over the nutrient coating, and a final outer coating comprising one or more fatty acids that are palatable to animals. Some preferred fatty acids are selected from a group of palatable fatty acid-containing animal food stock comprising coconut oils, corn products, soy bean, mustard seed, sesame seed, cottonseed, sun flower seed, ground nuts and combinations thereof.

In another preferred embodiment, the moisture-resistant outer coating comprises one or more paraffinic hydrocarbons. Calcium containing substances, calcium chloride for example is distasteful to animals. It is important, therefore, that the paraffinic hydrocarbon coating is palatable to the animals that will be fed these particles. With supplements comprising final coatings of fatty acid, the fatty acid should be selected with properties that are agreeable to the animals and, at least more palatable than the calcium core. Alternatively, a palatable substance can be added to the outer coating to make it more palatable.

In an alternative embodiment of the calcium supplement for animals, the supplement comprises calcium chloride particles, a nutrient coating deposited over the outer surface of the calcium chloride particles, and a second coating of urea over the nutrient coating. Preferably, an outer coating of fatty acids is placed over the urea coating that is both palatable to animals and moisture resistant. In another alternative of this invention, the outer coating can comprise one or more paraffinic hydrocarbons that are palatable to animals.

Another preferred embodiment of this invention comprises core particles that are a blend of calcium chloride and nutrients specific to animals. Each particle comprises an outer surface with a first coating over the outer surface. The first coating can comprise urea. Preferably, an outer coating comprises one or more fatty acids that are palatable to animals. Paraffinic hydrocarbons can be used as the outer coating. In another aspect, particles can comprise a blend of calcium chloride, macronutrients and micronutrients specific to animals.

The calcium supplement of this invention can be adapted to a variety of animals including mammals and birds. In one embodiment for birds, the nutrients would specifically be added in type and quantity that are appropriate for the birds to be fed, chickens, emus or turkeys for example. The supplement can also be a blend of bird feed and calcium-containing particles. Similarly, the calcium supplement can be adapted for specific mammals, cows, lambs, horses or pigs, by adjusting the amounts of calcium, and the type and amount of nutrients, including urea, that are added so that they are appropriate for specific animals.

In one preferred method for making a calcium supplement for animals, the method comprises the steps of first coating calcium-containing granules with a layer of nutrients; then spraying molten soluble urea onto previously coated calcium-containing granules. The granules are allowed to become sufficiently cool to solidify the molten material into second coating on the granules. A third coating of one or more palatable fatty acids or paraffinic hydrocarbons is sprayed onto the urea coating.

DETAILED DESCRIPTION OF THE PREFERRED EMBODIMENTS

The life-essential calcium containing animal feed supplements of this invention beneficially provide calcium, nitrogen and other nutrients in a feed particle that is free-flowing and moisture resistant. According to the teachings of this invention, a core of a calcium containing material that is hygroscopic and deliquescent can have one or more coatings that are moisture resistant or even hydrophobic to inhibit water absorption. The coated particles may then be shipped, stored and handled as a dry, anhydrous product with less risk of problems caused by exposure to humidity.

In one embodiment of calcium feed supplement for animals, the supplement comprises one or more coatings over a calcium-containing core. The calcium-containing core is in the form of a particle or pellet.

These pellets can be mixed in with the animal's regular dry feed to facilitate administering to the animals. Each pellet or particle can comprise a nutrient coating over the outer surface of the particle. A second coating, urea, for example, which is less hydroscopic and yet soluble, is deposited over the nutrient coating. One or more fatty acids are used as an outer coating. Fatty acids are selected to reduce the moisture uptake by the calcium-containing core as well as to make the particle more palatable to the animals. The fatty acids will break down during the digestive process to allow animals to absorb the other nutrients.

In one aspect of this invention, the calcium of the calcium-containing particle comprises calcium carbonate. Alternatively, the calcium-containing particle can comprise calcium chloride. In still another alternative, the calcium source is selected from a group comprising calcium chloride, calcium carbonate, calcium nitrate, calcium acetate, a calcium salt of an organic acid, a calcium saccharide compound, and a combination thereof. The nutrient coating can comprise sources of iron, magnesium, zinc, copper, cobalt, molybdenum, selenium, iodine, chlorine, nitrogen, phosphorous, sulfur, sodium, manganese, potassium and combinations thereof. The type of calcium source and the specific nutrients selected to add to the calcium supplement depend on the animal targeted to be fed. Nutrients, including micronutrients required by specific animals, are well know in the industry as is the quantity of the selected nutrients that is appropriate for the targeted animal.

The urea coating on the particles supplies the nutrient, nitrogen, in the form of ammonia. Because of the possible toxic effects of urea, it is preferred that the urea is present in an amount less than 4% of the dry weight of the particles and more preferably, depending on the type of animal targeted for the supplement, in an amount less than 1% of the dry weight of the particles.

The fatty acid used in the outer coating is also chosen for its applicability to a specific animal group and can be selected from a group of fatty acid-containing animal food stocks comprising coconut oils, corn products, soy bean, mustard seed, sesame seed, cottonseed, sun flower seed, ground nuts and combinations thereof.

In another preferred embodiment of this invention, the outer coating can comprise a paraffinic hydrocarbon. The paraffinic hydrocarbons selected for use as an outer coating are approved by regulating authorities for livestock use. These paraffinic hydrocarbons used as the outer coating for the calcium supplement are selectively refined hydrocarbon oil such as mineral oils and petrolatum that are characterized as inert and innocuous to animals. Mineral oils and petrolatum are moisture barriers, and therefore, protect the inner hygroscopic and deliquescent calcium-containing core of the feed supplement during transporting and storage. In one embodiment, the paraffinic hydrocarbon comprises alkanes, branched alkanes, and alicyclic compounds. Because the selected paraffinic hydrocarbons are innocuous, they are agreeable to animals. In one preferred embodiment, additional substances, soluble sugars for example, can be added to the paraffinic hydrocarbon coating to make it more palatable to animals.

In one preferred embodiment, the calcium supplement for animals comprises calcium chloride particles. Each particle has an outer surface. One or more coatings can be added to the outer surface of the particle. A nutrient coating can be placed over the outer surface of the calcium chloride particles along with a second coating comprising urea. A moisture barrier, such as one or more fatty acids or one or more paraffinic hydrocarbons, can be used as the outer layer or coating. The fatty acid and paraffinic hydrocarbon is selected for the property of being agreeable or palatable to animals.

In one preferred embodiment of a calcium supplement for animals, the supplement comprises a pellet of a blend of calcium chloride and nutrients particles that are specific to animals. Each particle comprises an outer surface with at least a first coating over its outer surface.

The first coating can comprise urea and the second and outer coating can comprise one or more fatty acids or paraffinic hydrocarbons lo that are agreeable or palatable to animals.

The nutrients selected for blending with the calcium containing particles can be macronutrients, micronutrients specific to animals, or both. The macro-nutrients are selected from a group comprising a source of magnesium, phosphorous, sulfur, sodium, chlorine, manganese, potassium and combinations thereof, and micronutrients are selected from a group comprising a source of iron, zinc, copper, cobalt, molybdenum, selenium, iodine, and combinations thereof In one specific embodiment of this invention, the calcium supplement is found in an enriched mammalian feed. The enriched mammalian feed comprises a blend of mammalian feed and calcium-containing particles. The calcium-containing particles can comprise calcium chloride, mammalian nutrients and micronutrients. The nutrients can be selected for a wide range of mammals or for the needs of specific mammals. A first coating of urea lies over an outer surface of the particles. A second coating lies over the urea coating and, comprises a moisture resistant layer that is palatable to mammals. The moisture resistant layer-can comprise a fatty acid, a paraffinic hydrocarbon or combinations of both. Additional substances can be added to this second coating comprising substances that are especially palatable to mammals.

In another embodiment, the calcium containing supplement comprises an enriched bird feed. The enriched bird feed comprises a blend of bird feed and calcium-containing particles. Preferably, the calcium-containing particles include a source of calcium, calcium chloride for example, bird macronutrients and micronutrients. Each particle has an outer surface with a first coating over the outer surface. The first coating can comprise a source of nitrogen, such as urea. A second coating lies over the urea coating and has the characteristic of being moisture resistant. Moisture resistant coatings can comprise fatty acids palatable to birds, paraffinic hydrocarbons, and combinations thereof. The nutrients can be selected for specific birds, chickens, turkeys, or emus for example. Additional supplements can be added to make the particles palatable to birds.

Another embodiment of this invention comprises a method for making a calcium supplement for animals. The coating of calcium particles is disclosed in a Tetra Technologies, Inc. U.S. Pat. No. 5,997,601 to Roger Kust, incorporated herein by reference in its entirety as if fully reproduced. In a preferred method for making a calcium supplement for animals, the method comprising the steps of coating calcium-containing granules with a layer of nutrients and then spraying molten soluble urea onto previously coated calcium-containing granules which are sufficiently cool to solidify the molten material into second coating on the granules. The urea coating can include a hydrophobic material.

A third coating of one or more fatty acids is sprayed onto the urea coating, the fatty acid coating being palatable to animals. Alternatively, the third coating can comprise paraffinic hydrocarbons that are agreeable to animals. Additional substances can be added to the outer coating to make the outer coating more palatable to animals. The size of the coated granules is determined by the size of the targeted animal that will consume the supplements. The nutrients can comprise both macronutrients and micronutrients.

In one preferred method, the calcium-containing granules are selected from a group consisting of calcium chloride, calcium carbonate, calcium, nitrate, calcium acetate, a calcium salt of an organic acid, a calcium saccharide compound, or a combination thereof. The paraffinic hydrocarbon can be selected from a mineral oil, a petrolatum with a melting point between 100° F. and 260° F. or combinations thereof.

An alternative method for making a calcium supplement for animals comprises blending calcium-containing granules with nutrients and then spraying molten soluble urea onto the blend of coated calcium-containing granules and nutrients, which are sufficiently cool to solidify the molten material into second coating on the granules. The nutrients can be sprayed onto calcium-containing granules. A second or outer coating of one or more fatty acids or paraffinic hydrocarbons can be sprayed onto the urea coating.

The calcium supplements for animals are generally made by applying a coating of the desired coating material. Specifically, the dry, granular calcium salt is fed into a coating device such as a drum granulator, drum coater, pan or disk granulator, pan or disk coater, a fluid bed granulator or coater or any other suitable device designed for coating.

Briefly, a rotary drum coater is inclined at an angle from about 0 degrees to about 10 degrees from the horizontal. The amount of inclination depends on the desired residence time and other operating parameters. The size of the drum is determined by the desired throughput. The coating agent in liquid form is introduced into the coating device through a system of spray nozzles.

A preferred first coating agent is molten urea (at 274° F./134° C.), but other materials such as molten ammonium nitrate, urea-water solutions, ammonium nitrate-water solutions, are also considered to be part of this invention. For the purposes of illustration and simplicity, the invention will be described below with reference to molten urea as a preferred example, but it is understood that the present invention is not limited to molten urea as the coating material.

The first coating apparatus should provide sufficient residence time, to allow the calcium salt core granules to be evenly coated, for example, 0.5 to 60 minutes. If desired, the coated calcium core can then be passed to a separate cooling or drying apparatus such as a drum or a fluid bed, preferably a rotary drum. The rotary drum dries or cools the coated core to a temperature below the melting point of the coating, so that the coated particles are no longer sticky. Where molten urea is used as a coating material, particles discharged from the rotary coating drum (or separate cooler if used) have a temperature below the melting point of urea, preferably below 48.8° C. Other molten coatings require different discharge temperatures. For aqueous or other solvent coating materials, the apparatus can serve as a dryer to remove water or other solvents by having heated air or another relatively dry inert gas introduced at the discharge point or at the feed point.

A coating of nutrients is optionally applied to the calcium salt core before the application of the urea coating by the previously described method so that an intermediate layer is formed between the calcium salt core and the urea coating. A third coating of one or more fatty acids or paraffinic hydrocarbons is sprayed onto the urea coating. Additional substances can be added, soluble sugars for example, to make the outer coatings more palatable to animals.

The foregoing description is illustrative and explanatory of preferred embodiments of the invention, and variations in the size, shape, materials and other details will become apparent to those skilled in the art. It is intended that all such variations and modifications, which fall within the scope or spirit of the appended claims, be embraced thereby.

The invention claimed is:

1. A calcium supplement for animals, the supplement comprising:
   calcium containing particles, each particle comprising an outer surface;
   a coating over the outer surface of the calcium containing particles, the coating comprising animal nutrients;
   a second coating over the nutrient coating, the second coating comprising urea in an amount comprising less than 4% of the dry weight of the particles; and
   an outer coating comprising one or more moisture resistant coatings; wherein the moisture resistant coating is agreeable to animals.

2. The calcium supplement of claim 1 wherein the calcium-containing particle comprises calcium carbonate.

3. The calcium supplement of claim 1 wherein the calcium-containing particle comprises calcium chloride.

4. The calcium supplement of claim 1 wherein the calcium source is selected from a group of comprising calcium chloride, calcium carbonate, calcium nitrate, calcium acetate, a calcium salt of an organic acid, a calcium saccharide compound, and a combination thereof.

5. The calcium supplement of claim 1 wherein the nutrient coating comprises sources of iron, magnesium, zinc, copper, cobalt, molybdenum, selenium, iodine, chlorine, nitrogen, phosphorous, sulfur, sodium, manganese, potassium and combinations thereof.

6. The calcium supplement of claim 1 wherein the moisture resistant coating comprises a fatty acid, the fatty acid selected from a group of fatty acid-containing animal food stock comprising coconut oils, corn products, soy bean, mustard seed, sesame seed, cottonseed, sun flower seed, ground nuts and combinations thereof.

7. The calcium supplement of claim 1 wherein the moisture resistant coating is selected from fatty acids, paraffinic hydrocarbons, and combinations thereof.

8. A calcium supplement for animals, the supplement comprising:
   calcium containing particles, each particle comprising an outer surface;
   a coating over the outer surface of the calcium containing particles, the coating comprisina animal nutrients;
   a second coating over the nutrient coating, the second coating comprising urea; and
   an outer coating comprising one or more paraffinic hydrocarbons;
   wherein the paraffinic hydrocarbon is agreeable to animals.

9. The calcium supplement of claim 8 wherein the calcium-containing particle comprises calcium carbonate.

10. The calcium supplement of claim 8 wherein the calcium-containing particle comprises calcium chloride.

11. The calcium supplement of claim 8 wherein the calcium source is selected from a group of comprising calcium chloride, calcium carbonate, nitrate, calcium acetate, a calcium salt of an organic acid, a calcium saccharide compound, and a combination thereof.

12. The calcium supplement of claim 8 wherein the nutrient coating comprises sources of iron, magnesium, zinc, copper, cobalt, molybdenum, selenium, chlorine, iodine, nitrogen, phosphorous, sulfur, sodium, manganese, potassium and combinations thereof.

13. The calcium supplement of claim 8 wherein the outer coating further comprises a combination of paraffinic hydrocarbon and fatty acid.

14. The calcium supplement of claim 8 wherein the paraffinic hydrocarbon comprises alkanes, branched alkanes, and alicyclic compounds so that the paraffinic hydrocarbon is agreeable to animals.

15. A calcium supplement for animals, the supplement comprising:
   calcium chloride particles, each particle comprising an outer surface;
   a coating over the outer surface of the calcium containing particles, the coating comprising animal nutrients;
   a second coating over the nutrient coating, the second coating comprising urea; and
   an outer coating comprising one or more fatty acids;
   wherein the fatty acid coating comprises a sugar that is palatable to animals.

16. A calcium supplement for animals, the supplement comprising:
   calcium chloride particles, each particle comprising an outer surface;
   a coating over the outer surface of the particles, the coating comprising animal nutrients;
   a second coating over the nutrient coating, the second coating comprising urea in an amount comprising less than 4% of the dry weight of the particles; and
   an outer coating comprising one or more paraffinic hydrocarbons;
   wherein the paraffinic hydrocarbon coating is agreeable to animals.

17. The calcium supplement of claim 16 wherein the paraffinic hydrocarbon coating further comprises an additional substance that is palatable to animals.

18. A calcium supplement for an animal, the supplement comprising:
   particles comprising a blend of calcium chloride and nutrients specific to the animal, each particle comprising an outer surface;
   a first coating over the outer surface of the particles, the first coating comprising urea in an amount compressing less than 4% of the dry weight of the particles; and
   an outer coating comprising one or more fatty acids;
   wherein the fatty acid coating is palatable to the animal.

19. A calcium supplement for an animal, the supplement comprising:
   particles comprising a blend of calcium chloride and nutrients specific to the animal, each particle comprising an outer surface;
   a first coating over the outer surface of the particles, the first coating comprising urea in an amount comprising less than 4% of the dry weight of the particles; and
   an outer coating comprising one or more paraffinic hydrocarbons;
wherein the paraffinic hydrocarbon coating is agreeable to the animal.

20. A calcium supplement for an animal, the supplement comprising:
   particles comprising a blend of calcium chloride, macronutrients and micronutrients specific to the animal, each particle comprising an outer surface;
   a first coating over the outer surface of the particles, the first coating comprising urea; and
   an outer coating comprising one or more paraffinic hydrocarbons;
wherein the paraffinic hydrocarbon coating is agreeable to the animal.

21. The calcium supplement of claim 20 wherein the macro-nutrients are selected from a group comprising a source of magnesium, phosphorous, sulfur, sodium, chlorine, manganese, potassium and combinations thereof and combinations thereof, and micronutrients are selected from a group comprising a source of iron, zinc, copper, cobalt, molybdenum, selenium, iodine, and combinations thereof.

22. A calcium supplement for an animal, the supplement comprising:
   particles comprising a blend of calcium chloride, macronutrients and micronutrients specific to the animal, the macro-nutrients and micro nutrients selected from a group comprising a source of iron, magnesium, zinc, copper, cobalt, molybdenum, selenium, iodine, chlorine, nitrogen, phosphorous, sulfur, sodium, manganese, potassium and combinations thereof;
   a first coating over the particles comprising urea in an amount comprising less than 4% of the dry weight of the particles; and
   an outer coating comprising one or more fatty acids.

23. A calcium supplement for an animal, the supplement comprising:
   particles comprising calcium chloride, each particle comprising an outer surface;
   a first coating on the outer surface of the particles comprising nutrients specific to the animal;
   a second coating on the particles comprising urea in an amount less than 4% of the dry weight of the particles; and
   an outer coating comprising one or more paraffinic hydrocarbons;
wherein the paraffinic hydrocarbon coating is agreeable to animals.

24. The calcium supplement of claim 23 wherein the second coating on the particles comprising urea in an amount less than 1% of the dry weight of the particles.

25. A calcium supplement for animals, the supplement comprising:
   core particles, the core particles comprising calcium chloride, and an outer surface;
   a first coating for the particles on the outer surface, the first coating comprising nutrients specific to animals;
   a second coating on the particles comprising urea in an amount less than 4% of the dry weight of the particles; and
   an outer coating comprising one or more fatty acids.

26. The calcium supplement of claim 25 wherein the second coating on the particles comprising urea in an amount less than 1% of the dry weight of the particles.

27. An enriched mammalian feed comprising:
   a blend of mammalian feed and calcium-containing particles,
   the calcium-containing particles comprising:
      calcium chloride, mammalian nutrients and micronutrients, each particle comprising an outer surface, a first coating over the outer surface, the first coating comprising urea in an amount comprising less than 4% of the dry weight of the particles,
      a second coating over the urea coating, the second coating comprising fatty acids palatable to mammals.

28. The calcium supplement of claim 27 wherein the mammalian nutrients and micronutrients are selected for a specific mammal.

29. An enriched mammalian feed comprising:
   a blend of mammalian feed and calcium-containing particles, the calcium-containing particles comprising:
   calcium chloride, mammalian nutrients and micronutrients, each particle comprising an outer surface, a first coating over the outer surface, the first coating comprising urea in an amount comprising less than 4% of the dry weight of the particles,
   a second coating over the urea coating, the second coating comprising one or more paraffinic hydrocarbons;
wherein the paraffinic hydrocarbon coating is agreeable to mammals.

30. An enriched bird feed comprising:
   a blend of bird feed and calcium-containing particles, the calcium-containing particles comprising:
      calcium chloride, bird nutrients and micronutrients, each particle comprising an outer surface, a first coating over the outer surface, the first coating comprising urea in an amount comprising less than 4% of the dry weight of the particles,
      a second coating over the urea coating, the second coating comprising fatty acids palatable to birds.

31. The calcium supplement of claim 30 wherein the bird nutrients and micronutrients are selected for a specific bird.

32. An enriched bird feed comprising:
   a blend of bird feed and calcium-containing particles,
   the calcium-containing particles comprising:
      calcium chloride, mammalian nutrients and micronutrients, each particle comprising an outer surface, a first coating over the outer surface, the first coating comprising urea in an amount comprising less than 4% of the dry weight of the particles,
      a second coating over the urea coating, the second coating comprising one or more paraffinic hydrocarbons;
wherein the paraffinic hydrocarbon coating comprises a sugar that is agreeable to birds.

33. A method for making a calcium supplement for animals, the method comprising the steps of:
   coating calcium-containing granules with a layer of nutrients;
   spraying molten soluble urea onto previously coated calcium-containing granules which are sufficiently cool to solidify the molten material into a second coating on the granules the urea in an amount comprising less than 4% of the dry weight of the particles; and spraying a third coating of one or more fatty acids onto the urea coating, the fatty acid coating palatable to animals.

34. The calcium supplement of claim 33 wherein the nutrients comprise micronutrients.

35. A method for making a calcium supplement for animals, the method comprising the steps of:

coating calcium-containing granules with a layer of nutrients;

spraying molten soluble urea onto previously coated calcium-containing granules which are sufficiently cool to solidify the molten material into second coating on the granules, the urea in an amount comprising less than 4% of the dry weight of the particles; and spraying a third coating of one or more paraffinic hydrocarbons onto the urea coating, the paraffinic hydrocarbon coating agreeable to animals.

36. The calcium supplement of claim 35 wherein the nutrients comprise micronutrients.

37. The method of claim 35 wherein the urea coating includes a hydrophobic material.

38. The method of claim 35 wherein the calcium-containing granules are selected from a group consisting of calcium chloride, calcium carbonate, calcium, nitrate, calcium acetate, a calcium salt of an organic acid, a calcium saccharide compound, or a combination thereof.

39. The method of claim 35 wherein the paraffinic hydrocarbon is petrolatum with a melting point between 100° F. and 260° F.

40. The method of claim 35 wherein the spraying step is effected in a rotating pan or drum.

41. A method for making a calcium supplement for animals, the method comprising the steps of:

blending calcium-containing granules with nutrients;

spraying molten soluble urea onto the blend of coated calcium-containing granules and nutrients which are sufficiently cool to solidify the molten material into a second coating on the granules; and spraying a second coating of one or more fatty acids onto the urea coating, the fatty acid coating comprising a sugar that is palatable to animals.

42. The method for making a calcium supplement of claim 41 wherein the nutrients are sprayed onto calcium-containing granules.

43. A method for making a calcium supplement for animals, the method comprising the steps of:

coating calcium-containing granules with a layer of nutrients;

spraying molten soluble urea onto previously coated calcium-containing granules which are sufficiently cool to solidify the molten material into a second coating on the granules, the urea in an amount comprising less than 4% of the dry weight of the particles; and spraying a third coating of one or more fatty acids onto the urea coating, the fatty acid coating palatable to animals.

* * * * *